B. D. CHAMBERLIN.
METHOD FOR THE PRODUCTION OF FORMED BLANKS UPON GATHERING IRONS.
APPLICATION FILED FEB. 1, 1912.
1,148,213.
Patented July 27, 1915.
3 SHEETS—SHEET 1.
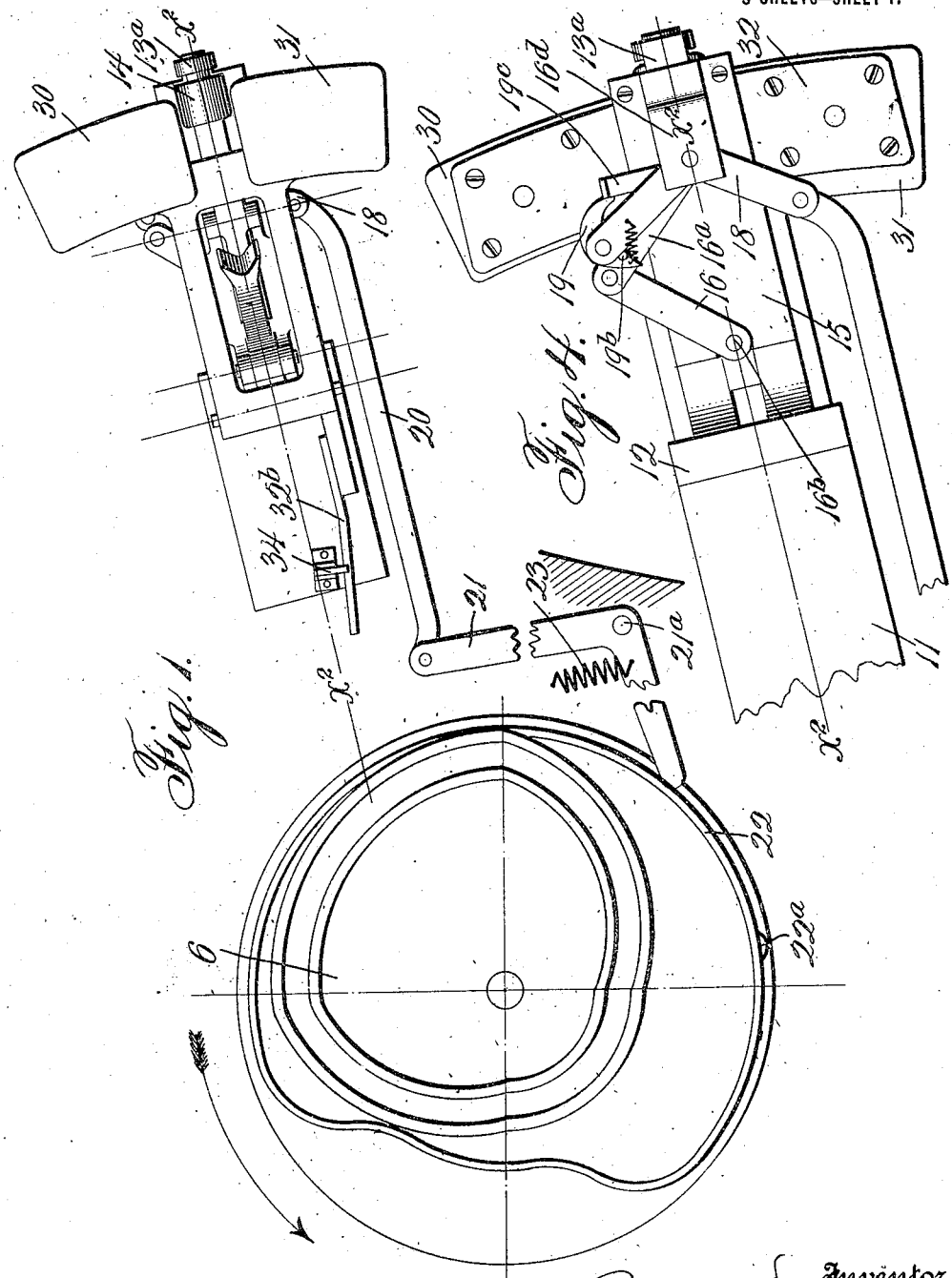

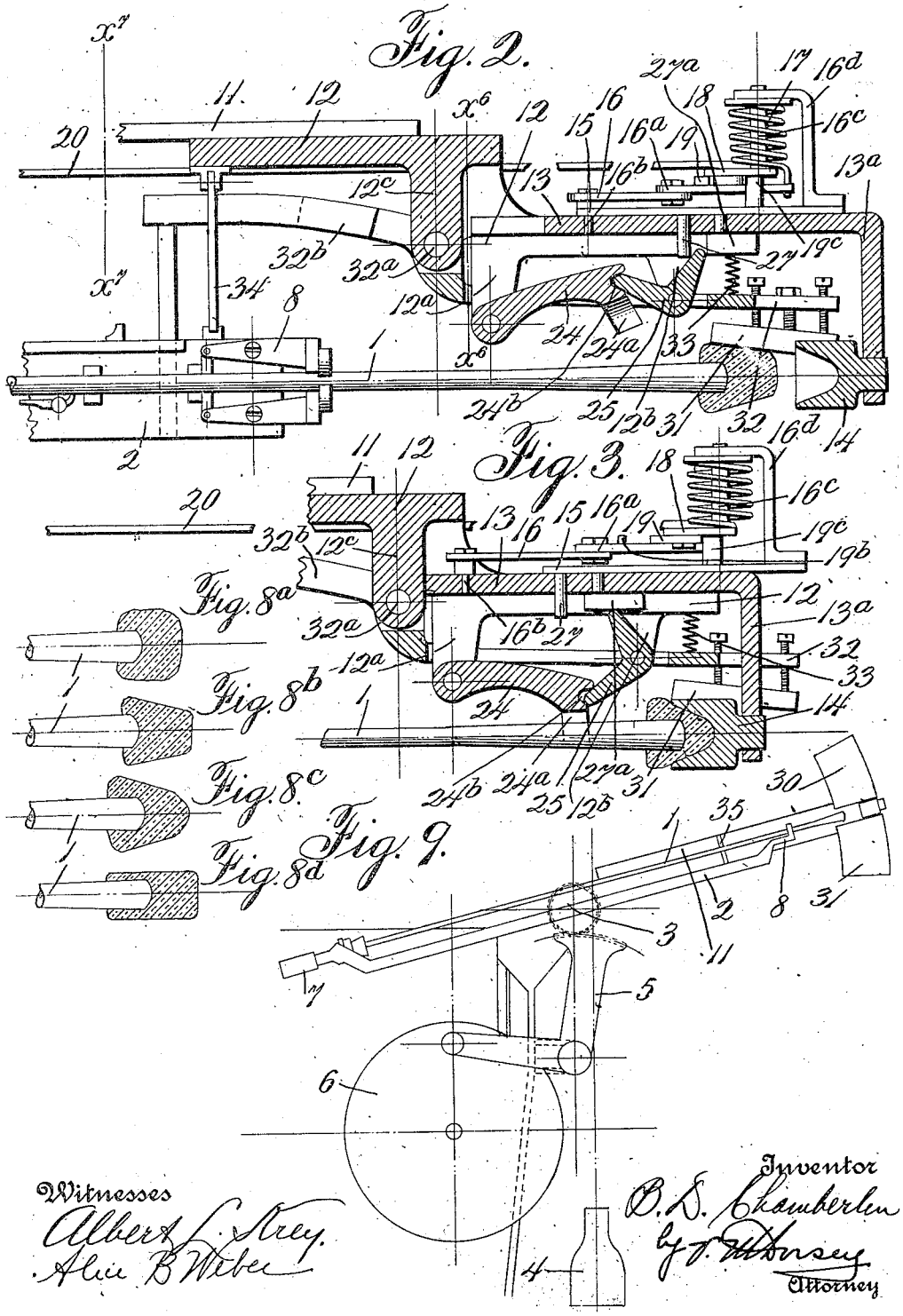

B. D. CHAMBERLIN.
METHOD FOR THE PRODUCTION OF FORMED BLANKS UPON GATHERING IRONS.
APPLICATION FILED FEB. 1, 1912.
1,148,213.
Patented July 27, 1915.
3 SHEETS—SHEET 3.
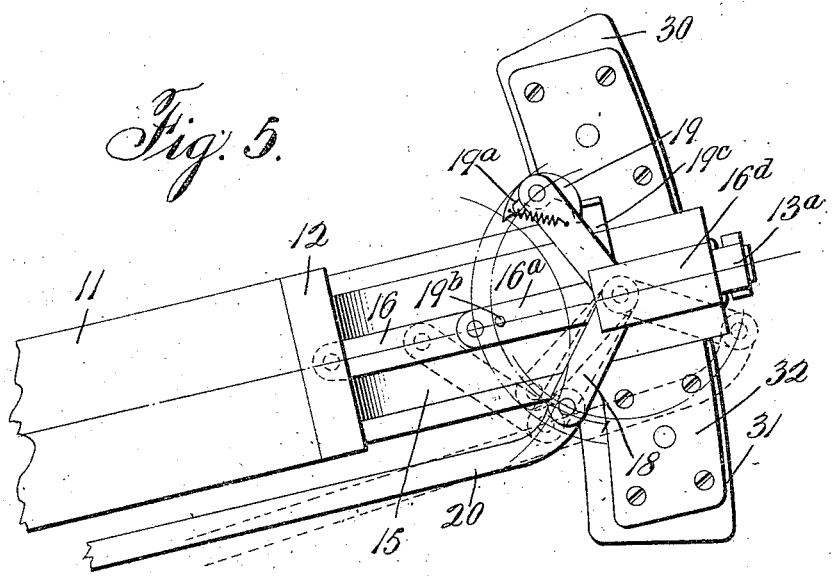
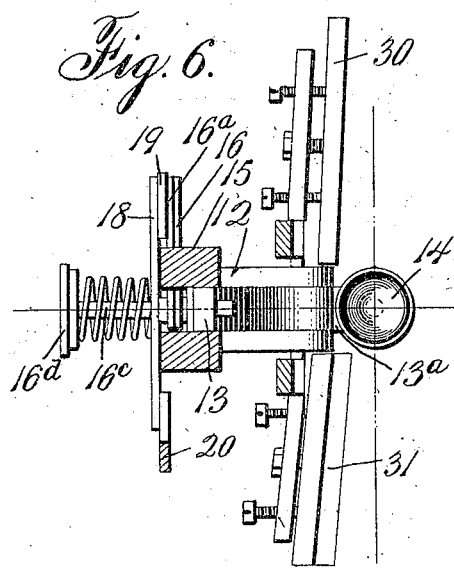
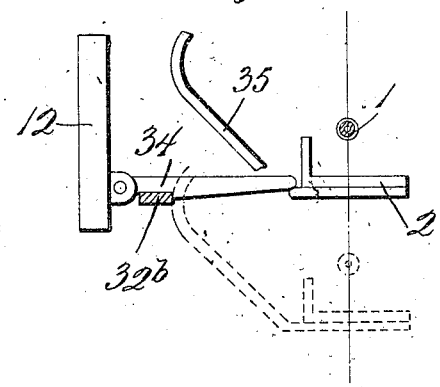

UNITED STATES PATENT OFFICE.

BENJAMIN D. CHAMBERLIN, OF CORNING, NEW YORK, ASSIGNOR TO EMPIRE MACHINE COMPANY, OF PORTLAND, MAINE, A CORPORATION OF MAINE.

METHOD FOR THE PRODUCTION OF FORMED BLANKS UPON GATHERING-IRONS.

1,148,213.     Specification of Letters Patent.     Patented July 27, 1915.

Application filed February 1, 1912. Serial No. 674,814.

*To all whom it may concern:*

Be it known that I, BENJAMIN D. CHAMBERLIN, a citizen of the United States, and a resident of Corning, county of Steuben, and State of New York, have invented certain new and useful Improvements in Methods for the Production of Formed Blanks Upon Gathering-Irons, of which the following is a specification.

My invention has for its object to provide a new and improved process for shaping and sizing blanks upon the ends of irons, and while it has special reference to a process and apparatus in which a blow-pipe which has a batch of glass gathered thereon and roughly marvered to generally shape it, has such rough marvered blank gaged as to size and shape and subsequently again marvered to further produce a homogeneous gather preliminary to a blowing operation, it is not limited to such marvering preceding or following the gaging or the blowing, as my invention also contemplates the affixing of the glass to the iron in any desired way, its entire working preliminary to final shaping being due merely to the gaging. Hence, although I have in the accompanying drawings shown and in the following specification will describe, my gaging invention as associated with marvering means, it will be understood that I do not in this respect restrict my invention to such association.

The particular invention here sought to be covered is the gaging of a batch of glass by molding it in a suitable mold cavity. It is desirable in the successful performance of the process here shown that the contact between the mold and gather at any time be limited in duration, as otherwise the mold might cause local cooling of the glass if chilled and if hot might adhere thereto. Again rotation of the glass is necessary to counteract the flow thereof, and if there be relative rotation between the gage mold and the gather, and contact between them is prolonged it might result in a twisting of the gather which is detrimental to the finished product. Neither of these objections however would be present in the same degree if the momentary contact between the gather and the gage mold be repeated at short intervals apart, each of the contacts being momentary.

Referring to the accompanying drawings in which corresponding parts are designated by corresponding marks of reference and in which I have shown a machine adapted to carry out the process hereafter described:—Figure 1 is a front elevation. Fig. 2 is a fragmental section on lines $x^2$—$x^2$ of Figs. 1 and 4 showing the blow-pipe in a position to have the blank thereon gaged. Fig. 3 is a fragmental section similar to that shown in Fig. 2, but showing the parts in a position they momentarily assume during the gaging. Fig. 4 is a fragmental rear elevation, corresponding to the position of Figs. 1 and 3. Fig. 5 is a view similar to Fig. 4, but showing the position of parts at a time corresponding to that of Fig. 3. Fig. 6 is a section on line $x^6$—$x^6$ of Fig. 2. Fig. 7 is a similar section on line $x^7$—$x^7$ of Fig. 2. Figs. $8^a$, $8^b$, $8^c$ and $8^d$ represent successive steps in the formation of a blank in the machine herein described. Fig. 9 is a diagrammatic view illustrating a general type of machine in which the present invention may be embodied.

For the purpose of facilitating the description of my invention I will state that it may be performed on a machine of the general type shown in Patent No. 1,124,698, dated Jan. 12, 1915, which machine is shown diagrammatically in Fig. 9, of the accompanying drawings. In that figure a removable blow-pipe 1 is carried in the blow-pipe frame 2, mounted on a horizontal pivot 3, the gather end of the blow-pipe being adapted to be swung upwardly through a limited vertical arc from the normal horizontal position in which it is loaded into the blow-pipe frame, and then downwardly, whereby the gather may be presented to a mold 4, the latter occurring when the blow-pipe is vertical. The movement of the blow-pipe is shown as due to a rack sector 5, actuated by a cam disk 6, the latter being driven in a predetermined manner by suitable mechanism not necessary to here describe. The blow-pipe frame carries on one end an air chuck 7 and at the other end a support 8 which grasps the blow-pipe adjacent to its gather end.

In carrying out my invention on such a machine I secure thereto a frame 11 which extends radially upward on an incline adjacent to the pivotal mounting of the blow-pipe frame and which serves as a support for certain mechanisms hereinbefore described. On the outer end of the frame is mounted a casting 12, having guided in its rear face a slide 13, the outer end of which is formed into a forwardly projecting arm 13$^a$, carrying the gage mold 14, having a smooth internal cavity of a proper size and shape, dependent upon the blank which is to be formed. The slide 13 is held in place upon the rear of the casting 12 by a cover plate 15, and in the rear of such cover plate are the toggle levers 16 and 16$^a$, the former of which is pivoted to the inner end of the slide at 16$^b$, while the latter is pivoted on the pin 16$^c$ projecting rearwardly from the cover plate and having its rear end supported in a bracket 16$^d$. Encircling the pin 16$^c$ is the helical spring 17, one end of which is secured to the bracket 16$^d$ and the other end of which is attached to the lever 16$^a$ and tends to throw the same to the position shown in dotted lines in Fig. 5. The spring 17 thus serves as an actuator for the gage 14.

Mounted upon the pin 16$^c$ in the rear of the lever 16$^a$, is a bell crank lever 18, the upper end of which carries a pivoted dog 19, the inner end of which has a notch adapted to engage a pin 19$^b$ on the lever 16$^a$, while the other end of the dog extends outwardly and is adapted to contact with a trip 19$^c$ secured to the cover plate. The lower arm of the bell crank 18 is pivoted to the outer end of a link 20, the inner end of which is pivoted to the vertical arm of a bell crank 21, pivoted at 21$^a$, on the frame of the machine and the horizontal arm of which projects into proximity to the cam disk 6. The disk has upon its front face a cam track 22, which is adapted, in the rotation of the disk, to vibrate the bell crank 21 and thus draw the link 20 inwardly, whereby the bell crank 18 will be swung through a certain arc. The arrangement of the cam track is such that starting with the parts in their normal position, shown in Figs. 1 and 4, when the gather end of the blow-pipe is swung upwardly and comes into axial alinement with the gaging mold, a projection 22$^a$ on such cam run will strike the horizontal arm of the bell crank 21 and thus oscillate the upper end of the bell crank 18 to its most outward position. Upon the continued movement of the cam plate, after the blow-pipe has swung to its highest position and in returning has passed the gage mold, the upper arm of the bell crank 21 will move the link 20 outwardly, this movement being caused by the proper shaping of the cam track and the contracting spring 23, which is attached to the lower arm of the bell crank 21. Subsequent movement will again move the bell crank 21 inwardly and restore the bell crank 18 to normal position. The movement of the upper end of the bell crank 18 to its outmost position, as before described, causes the tail of the dog 19 to bear upon a trip 19$^c$ and thus release the notch 19$^a$ on the dog from the pin 19$^b$ on the lever 16$^a$, with which it is in engagement in the normal position of the machine, and by which the tendency of the spring 17 to throw the toggle levers is restrained. This release of the toggle levers causes the spring 17 to throw the toggle levers from the position shown in Fig. 4 to that shown dotted on Fig. 5, the levers in moving from the one position to the other momentarily assuming the position shown in full lines in Fig. 5. Thus the slide 13 carrying the gage mold is projected inwardly (until the toggle levers become in alinement) and is then, by the continued movement of the levers, thrown outwardly, being restored to normal position. Inasmuch as the release of the toggle levers by the described movement of the bell crank 18 takes place when the blow-pipe by its movement has been brought into axial alinement with the gage mold, the latter will be projected on to the glass upon the blow-pipe and will be instantly withdrawn therefrom. The inward movement of the upper end of the bell crank lever 18 after the blow-pipe on its return movement has passed the gage mold will bring the parts to the position shown in dotted lines in Fig. 5, in which the dog 19 will again engage the pin 19$^c$ on the toggle lever 16$^a$, and then the subsequent outward movement of the upper end of such bell crank 18 will by the engagement of the dog 19 with the pin 19$^c$ restore the parts to normal position, the movement of the arm 18 being arrested prior to the time at which the dog would release the toggle lever 16$^a$.

Mounted in ears 12$^a$ on the forward face of the bracket 12 is a pawl 24 having a bifurcated end 24$^a$, and provided adjacent to such end with a notch 24$^b$, in which one end of a bell crank 25 pivoted in forwardly projecting ears 12$^b$ on the bracket 12 is adapted to engage, the opposite end of such bell crank projecting forwardly and rearwardly between a pin 27 and a block 27$^a$ which project from the forward face of the slide 13. In the normal position of these parts the pawl lies behind the plane in which the blow-pipe is oscillated up and down, but upon the release of the toggle levers to bring the gage mold into contact with the gather, the block 27$^a$ upon the slide 13 strikes the forwardly projecting end of the crank 25 and throws the latter, whereby the pawl 24 will be projected outwardly toward the plane in which the blow-pipe swings, the forked end 24$^a$ of the pawl engaging the blow-pipe and centering it opposite the gage mold. This takes place early in the stroke of the slide, and the subsequent movement of the latter, without further movement of the pawl 24 is permitted by the end of the crank 25 escaping the inner end of the block and sliding on the forward face thereof (see Fig. 2). It will be noted that this forward projection of the pawl is but momentary, including the period of the impact of the gage mold on the gather. When the slide returns to normal position the pin 27 restores the parts 24 and 25 also to normal position.

With the gage mold mechanism above described I have shown associated a marvering mechanism, although I do not wish to restrict my invention to a process involving both marvering and gaging. This mechanism comprises an upper and a lower marvering plate 30 and 31, respectively, independently adjustably mounted on the outer end of a bifurcated frame 32, one of the said plates being above and the other below the gage mold. The frame 32 is pivoted at $32^a$ on the lug $12^c$ projecting forwardly from the bracket 12, and straddles the ears $12^a$ and $12^b$ thereon, an upwardly projecting tail $32^b$ on the frame 32 projecting inwardly toward the pivotal point of the blow-pipe frame and in front of the frame 11. The marverer frame is normally drawn rearwardly from the plane in which the blow-pipe oscillates by a spring 33, but its motion in this respect is arrested by a catch 34 pivoted on the front face of the bracket 12 and engaging the tail $32^b$, the catch being so positioned that upon the movement of the blow-pipe frame to its uppermost limit, the latter will lift the catch and thus release the marverer frame to permit the spring 33 to withdraw the marverer plates away from the plane of oscillation of the blow-pipe. By the means before described the marverer plates are held in proper position during the upward movement of the gather upon the blow-pipe to marver the gather but are withdrawn to permit the descent of the blow-pipe without causing the gather thereon to come in contact with such plates. For the purpose of restoring the marverer plate to normal position, a cam arm 35 projects rearwardly and upwardly from the blow-pipe frame, and is adapted, after the gather on the blow-pipe has on its descent passed the marverer plates, to restore the latter to normal position, where they will be caught by the latch 34.

In case the marverer plates are to be used they are so set that the lower plate 31 on which the glass is first worked is at an angle to the axial line of the blow-pipe, whereby a gather having the general form shown in Fig. $8^a$ will after passing thereover, be the given shape of an irregular truncated-cone, and the surplus of the gather worked back, to a greater or less extent, upon the blow-pipe. It is in this shape when brought opposite the gage mold, which is projected thereon. Inasmuch as the cavity of this has a definite capacity and as the gage mold in every operation is moved forward a uniform distance and is brought within a fixed distance of the blow-pipe, which are of like length, it follows that any surplus glass over the predetermined quantity measured by the capacity of the gage mold will be forced back upon the blow-pipe. As only that part of the gather which extends beyond the end of the blow-pipe will become distributed to form the finished article, it will be seen that each blank after the gage mold has come in contact therewith consists of a uniform quantity of material which will be utilized in the subsequent manufacture of the finished article. After momentary shaping by the gage mold the upward movement of the blow-pipe, which in the construction here described is momentarily arrested during the gaging, brings the gaged blank thereon into contact with the upper marverer 30 by which the blank is slightly elongated and by which any imperfections left by the gage mold are eliminated. The blank is now ready for elongation and blowing and I prefer to accomplish this by the mechanism shown in my other Patent No. 1,124,699, dated Jan. 12, 1915, in which a limited and definite quantity of air is forcibly injected into the blank before elongation, this being the more desirable as the mouth of the internal bore of the blow-pipe is now closed by the glass and which has been forced therein during the gaging. For this purpose the chuck shown in Fig. 9 may be of a form shown in my said Patent No. 1,124,699.

I do not in this application make any claims on mechanism herein shown and described, as claims herein are directed to the process herein shown, and claims upon the mechanism form the subject-matter of my other applications to-wit,—Serial No. 491,812, filed April 23, 1909, Serial No. 551,198, filed March 23, 1910, Serial No. 657269, filed Oct. 28, 1911, and Serial No. 504 filed January 4, 1915, now pending in the U. S. Patent Office.

Having thus described my invention what I claim and desire to secure by Letters Patent is:—

1. The hereinbefore described process of forming glass blanks which consists in affixing a solid batch of glass upon an iron, the glass projecting beyond the end thereof and subsequently pressing the glass rearwardly on the iron while limiting the lateral spread of the glass until only a definite and measured quantity thereof remains beyond the end of the iron and blowing the solid gage portion of the glass so formed.

2. The hereinbefore described process of forming solid blanks upon gathering irons, consisting in affixing a batch of glass to an iron, the glass projecting beyond the end thereof and in pressing the glass rearwardly upon the iron while limiting the lateral spread of the glass so that only a definite quantity of glass extends beyond the end thereof, by momentary contact with the glass.

3. The hereinbefore described process of forming solid uniform glass blanks, which consists in gathering a batch of glass on the end of a blow-pipe, and in subsequently shaping the same while on the blow pipe by momentary inclusion thereof in a mold whose cubic contents is less than the cubic contents of the batch of glass whereby a part of such batch is displaced rearwardly along the blow pipe.

4. The hereinbefore described process of forming solid glass blanks which consists in gathering a batch of glass on a gathering tool, and then shaping while on the tool a part of the batch of glass to a uniform size and shape by the momentary impact therewith of the walls of a cavity having a predetermined size and shape of less cubic contents than the batch of glass, whereby a part of said batch of glass is displaced rearwardly on the gathering tool.

5. The hereinbefore described process of forming solid blanks which consists in gathering a batch of glass on the end of a gathering tool, working the same upon a marverer to accomplish a partial shaping and distribution of the glass and in momentarily inclosing the marvered blank in a cavity of definite size and shape having less cubic contents than the marvered blank whereby a part of the blank is forced rearwardly on the gathering tool.

6. The hereinbefore described process of forming solid blanks which consists in gathering a batch of glass on the end of a gathering tool, working the same upon a marverer to accomplish a partial shaping and distribution of the glass; in momentarily inclosing the marvered blank in a cavity of definite size and shape and in then again subjecting the blank to the action of a marverer to partially elongate the same.

7. The hereinbefore described process of forming solid blanks which consists in working a mass of glass by side pressure, applying end pressure to the glass thus worked to upset it and in then working the glass by side pressure to a cylindrical form, whereby it is elongated.

8. The hereinbefore described process of forming solid blanks which consists in working a mass of glass by side pressure, in then applying end pressure to the glass and simultaneously limiting the side spread thereof caused thereby, and in then working the glass to cylindrical form by side pressure, whereby it is caused to elongate.

9. The hereinbefore described process of forming solid blanks which consists in working by side pressure a mass of glass into tapered form and then into a cylindrical form, whereby it is forcibly elongated.

10. The hereinbefore described process of forming solid blanks which consists in working a mass of glass in the tapered form by side pressure, applying end pressure to the glass thus tapered to upset it and in then working the glass by side pressure to a cylindrical form, whereby it is elongated.

11. The hereinbefore described process of forming solid blanks which consists in working a mass of glass into tapered form by side pressure, in then applying end pressure to the glass and simultaneously limiting the side spread thereof caused thereby, and in then working the glass to cylindrical form by side pressure, whereby it is caused to elongate.

12. The hereinbefore described process of forming solid blanks which consists in affixing a batch of glass to the end of a blow iron, and in causing it to project from the end thereof, working the projecting portion of the glass by side pressure, and in then applying end pressure to the projected portion of the glass while limiting its sidewise flow.

13. The hereinbefore described process of working glass which consists in forming a blank by affixing a solid batch of glass upon an iron, the glass projecting beyond the end thereof, working such glass upon a marverer to partially shape and distribute the glass, in pressing the solid glass rearwardly on the iron while limiting the lateral spread of the glass by inclosing the marvered blank in a cavity of definite size and shape, and then again subjecting the blank to the action of a marverer to finish the surface thereof, and then blowing the solid gaged portion of the blank so formed.

14. The hereinbefore described process of working glass which consists in forming a blank by affixing a solid batch of glass upon an iron, the glass projecting beyond the end thereof, working such glass upon a marverer to partially shape and distribute the glass, in pressing the solid glass rearwardly on the iron while limiting the lateral spread of the glass by momentarily inclosing the marvered blank in a cavity of definite size and shape and then again subjecting the blank to the action of a marverer to finish the surface thereof, and then blowing the solid gaged portion of the blank so formed.

15. The hereinbefore described process of working glass which consists in forming a blank by affixing a solid batch of glass upon an iron, the glass projecting beyond the end thereof, in pressing the solid glass rearwardly on the iron while limiting the lateral spread of the glass by inclosing the blank in a cavity of definite size and shape and then again subjecting the blank to the action of a marverer to finish the surface thereof, and then blowing the solid gaged portion of the blank so formed.

16. The hereinbefore described process of working glass which consists in forming a blank by affixing a solid batch of glass upon an iron, the glass projecting beyond the end thereof, in pressing the solid glass rearwardly on the iron while limiting the lateral spread of the glass by momentarily inclosing the marvered blank in a cavity of definite size and shape, and then again subjecting the blank to the action of a marverer to finish the surface thereof, and then blowing the solid gaged portion of the blank so formed.

17. The hereinbefore described process of working glass which consists in gathering a batch of glass on the end of a gathering tool, working the same upon a marverer to partially shape and distribute the glass so that the glass projects beyond the end of a tool, in pressing the resultant solid glass blank rearwardly on the iron while limiting the lateral spread of the glass by momentarily inclosing the marvered blank in a cavity of definite size and shape having less cubic contents than the marvered blank, whereby a part of the blank is forced rearwardly on the gathering tool, and in blowing the solid gaged portion of the blank so formed.

18. The hereinbefore described process of working glass which consists in gathering a batch of glass on the end of a gathering tool, working the same upon a marverer to partially shape and distribute the glass so that the glass projects beyond the end of a tool, in pressing the resultant solid glass blank rearwardly on the iron while limiting the lateral spread of the glass by inclosing the marvered blank in a cavity of definite size and shape having less cubic contents than the marvered blank, whereby a part of the blank is forced rearwardly on the gathering tool, and in blowing the solid gaged portion of the blank so formed.

In testimony whereof I have hereunto signed my name.

BENJAMIN D. CHAMBERLIN.

In presence of—
 DELPHINE KEAGLE,
 R. H. CURTIS.